Figure 2:
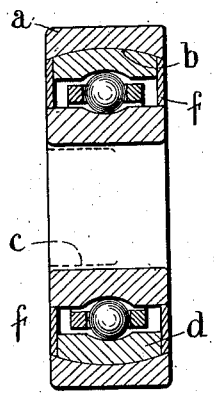

O. A. SCHMIDT.
ANTIFRICTION BEARING.
APPLICATION FILED SEPT. 15, 1910.

1,009,586.

Patented Nov. 21, 1911.

WITNESSES.
Wm Map Durall
Edwin J. Beller

INVENTOR.
O. A. Schmidt,
by Wilkinson, Fisher & Witherspoon
Attys.

UNITED STATES PATENT OFFICE.

OTTO ALWIN SCHMIDT, OF CHELMSFORD, ENGLAND, ASSIGNOR TO THE HOFFMANN MANUFACTURING COMPANY, LIMITED, OF LONDON, ENGLAND.

ANTIFRICTION-BEARING.

1,009,586.   Specification of Letters Patent.   Patented Nov. 21, 1911.

Application filed September 15, 1910. Serial No. 582,218.

*To all whom it may concern:*

Be it known that I, OTTO ALWIN SCHMIDT, a subject of His Majesty the German Emperor, residing at Chelmsford, in the county of Essex, England, have invented a certain new and useful Improvement in Antifriction-Bearings, of which the following is a specification.

This invention relates to an improved construction of ball or roller bearing of the annular ring type, adapted to receive pressure at right angles to the central axis thereof and of the kind in which the bearing is so held in the housing that it may universally turn in any direction, and the invention has for its object to provide improved means for inserting the bearing in and withdrawing it from the housing. Heretofore bearings of this kind have been constructed by forming a spherical surface upon the outer race ring thereof and fitting same into a spherical seating, formed either in a ring having a plain outer surface adapted to be held in a cylindrically bored casing, or in a housing split either in one place or into two or more pieces. Also ball thrust bearings are known in which the balls are supported sidewise by inner rings having outer surfaces forming parts of the same sphere and adapted to engage with a correspondingly shaped outer inclosing ring having recesses to permit the inner rings and the balls to be inserted and withdrawn therefrom or alternatively portions of the peripheries of the inner rings have been cut away for this purpose.

According to this invention the housing is in one piece and portions of the spherical surface of its seating or of the outer race ring of the bearing (which is of the self contained type) or both, are removed at opposite ends of a diameter of the housing or of the bearing so that when the latter is placed at right angles to the housing in the usual manner for the purpose of mounting or dismounting it, less force than usual will be required, and the danger of deforming the housing or cracking the ring will be considerably lessened. The housing may be made in the form of an external ring having the same width as the race rings or narrower or wider if desired, or may be in the form of a pedestal or hanger or any desired shape. Dust washers or grease retaining rings are also provided which are of special construction and render the bearing dust tight without weakening same by screw or other fastenings.

To enable the invention to be fully understood it will now be described by reference to the accompanying drawings in which:—

Figure 1:
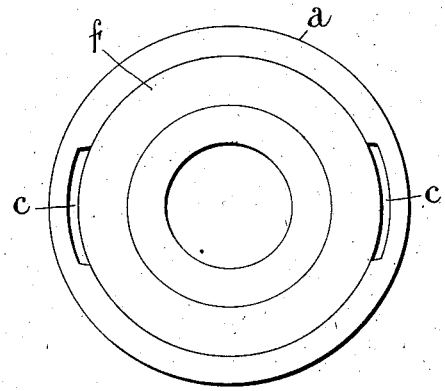
Figure 3:
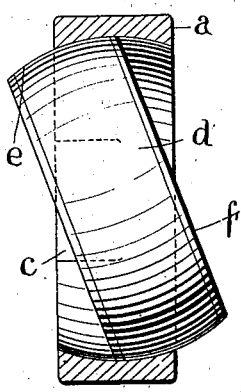

Figure 1 is a front view of a single row ball bearing and housing constructed according to the invention and provided with dust washers, and Fig. 2 is a sectional elevation of same, and Fig. 3 is a part sectional elevation showing the bearing displaced in the housing.

*a* is the housing having an interior spherical surface at *b*, and *c* are recesses or notches formed therein at opposite ends of a diameter.

*d* is the outer race ring of the bearing having a spherical outer surface at *e*, said bearing being of the self contained type.

To remove the bearing from the housing it may be swung around at right angles and turned until it rests opposite the notches or recesses *c*, when it can be easily removed.

It will be obvious that the pressure required to assemble or remove the bearing from the housing *a* will depend upon the depth of the notches or grooves *c*.

The above methods may be assisted by expanding the parts by heat.

The concavity of the internal face *b* of the housing *a* affords a convenient means for holding against each face of the bearing an annular ring *f* forming a dust washer or grease holder, the outer edge of each ring coming inside of the curvature of the housing face *b*. The outer edge of each ring *f* is formed with a curvature corresponding to that of the curved outer surface of the bearing, so that the rings may be inserted with the bearing into the housing *a* or removed therefrom, no screw or other fastenings being necessary, the curvature of the housing holding the rings in position.

What I claim is:—

In an anti-friction bearing, the combination of an annular housing having a spherical seat at a right angle to the diameter thereof, an outer race ring of less width than the housing and having an outer spherical surface adapted to be forced into contact with the spherical seat of the housing, the spherical seat of the housing being recessed at diametrically opposite points to receive the outer race ring, an inner race ring, antifriction balls between said rings, and dust washers having curved edges corresponding to the spherical seat of the housing whereby they can be forced at right angles to their diameters into said spherical seat and retained thereby when in normal position, substantially as described.

In witness whereof I have hereunto set my hand in the presence of two subscribing witnesses.

OTTO ALWIN SCHMIDT.

Witnesses:
G. F. BARRETT,
C. H. BARRETT.